US012775882B2

(12) United States Patent
Tsoi et al.

(10) Patent No.: US 12,775,882 B2
(45) Date of Patent: Oct. 27, 2026

(54) METHOD FOR VERIFYING CORRECTNESS OF MODEL CONVERSION UNDER DEPLOYMENT FRAMEWORK AND COMPUTING DEVICE

(71) Applicant: Shenzhen Corerain Technologies Co., Ltd., Shenzhen (CN)

(72) Inventors: Kuen Hung Tsoi, Shenzhen (CN); Xinyu Niu, Shenzhen (CN)

(73) Assignee: Shenzhen Corerain Technologies Co. Ltd., Shenzhen (CN)

( * ) Notice: Subject to any disclaimer, the term of this patent is extended or adjusted under 35 U.S.C. 154(b) by 377 days.

(21) Appl. No.: 18/735,351

(22) Filed: Jun. 6, 2024

(65) Prior Publication Data

US 2025/0124344 A1 Apr. 17, 2025

(30) Foreign Application Priority Data

Oct. 11, 2023 (CN) ......................... 202311308246.0

(51) Int. Cl.
*G06N 20/00* (2019.01)
*G06F 11/3604* (2025.01)
*G06N 3/10* (2006.01)

(52) U.S. Cl.
CPC ......... *G06N 20/00* (2019.01); *G06F 11/3612* (2013.01); *G06N 3/10* (2013.01)

(58) Field of Classification Search
CPC ....... G06N 20/00; G06N 3/10; G06F 11/3612
See application file for complete search history.

(56) References Cited

U.S. PATENT DOCUMENTS 11,151,020 B1 * 10/2021 Bajoria ............... G06F 11/3476
11,169,798 B1 * 11/2021 Palmer ................ G06F 16/9024
(Continued)

FOREIGN PATENT DOCUMENTS

CN 113326913 A 8/2021
CN 113485697 A 10/2021
(Continued)

OTHER PUBLICATIONS

Office Action issued Nov. 21, 2023, in corresponding Chinese Application No. 202311308246.0, 17 pages.
(Continued)

*Primary Examiner* — Jorge A Casanova
(74) *Attorney, Agent, or Firm* — Maier & Maier, PLLC

(57) ABSTRACT

A method for verifying correctness of model conversion under a deployment framework, and a computing device. The method for verifying correctness of model conversion under the deployment framework includes: acquiring, under a training framework, a trained model to be converted; acquiring a first intermediate result of the trained model to be converted, as contrast data; converting the trained model to be converted, into a deployment model; loading the deployment model under the deployment framework; executing the deployment model and acquiring a second intermediate result; and comparing the second intermediate results of the deployment model with the contrast data of the trained model, to locate a correctness-related problem of the deployment model before the deployment model completes execution. Accordingly, a problem node can be located quickly and accurately.

16 Claims, 6 Drawing Sheets

(56) References Cited

U.S. PATENT DOCUMENTS

| | | | | |
|---|---|---|---|---|
| 12,099,904 | B2 * | 9/2024 | Cao | G06F 8/41 |
| 2008/0028057 | A1 * | 1/2008 | Reason | G06Q 20/20 709/223 |
| 2009/0112566 | A1 * | 4/2009 | Chancey | G06F 8/30 703/22 |
| 2019/0129700 | A1 * | 5/2019 | Subramaniyan | G06F 11/36 |
| 2020/0349469 | A1 * | 11/2020 | Katzenberger | G06F 12/0207 |
| 2022/0012575 | A1 * | 1/2022 | Fok | G06F 11/3024 |
| 2023/0031636 | A1 * | 2/2023 | Dong | G06N 3/10 |
| 2023/0083843 | A1 * | 3/2023 | Sheela | G06F 16/212 707/803 |
| 2023/0161578 | A1 * | 5/2023 | Wu | G06F 16/38 717/106 |
| 2024/0012739 | A1 * | 1/2024 | Choudhury | G06F 11/3612 |
| 2026/0003885 | A1 * | 1/2026 | Leung | G06F 16/26 |

FOREIGN PATENT DOCUMENTS

| | | | |
|---|---|---|---|
| CN | 114021705 | A | 2/2022 |
| CN | 114546592 | A | 5/2022 |
| CN | 115187821 | A | 10/2022 |
| CN | 115640851 | A | 1/2023 |
| CN | 116306777 | A | 6/2023 |

OTHER PUBLICATIONS

Supplementary Search issued Dec. 14, 2023, in corresponding Chinese Application No. 202311308246.0, 4 pages.

* cited by examiner

METHOD FOR VERIFYING CORRECTNESS OF MODEL CONVERSION UNDER DEPLOYMENT FRAMEWORK AND COMPUTING DEVICE

TECHNICAL FIELD

The application relates to the technical field of artificial intelligence, and in particular to a method for verifying correctness of model conversion under a deployment framework, and a computing device.

BACKGROUND

Model conversion is intended to allow for circulation of a model between different frameworks. In practice, model conversion is almost used in industrial deployment and responsible for the connection of the model from a training framework to deployment and inference frameworks. This is because, with the evolution of AI deep learning applications and technologies, the functions of the training and inference frameworks have been gradually differentiated. The training framework often focuses on ease of use and is oriented to researchers designing algorithms, with the goal of allowing the researchers to produce high-performance models more quickly. The inference framework often focuses on the extreme optimization and acceleration of hardware platforms and is oriented to industrial implementation, with the goal of allowing models to be executed more quickly.

In the field of deep learning, the training and deployment of a deep learning model is typically conducted in different deep learning frameworks. Depending on the functions and focuses, there is no deep learning framework that reaches every aspect to completely unify the training and inference, and moreover, the representations of models within each framework differ greatly. The framework required for training is easy to develop and allows for quick verification of ideas, and the framework required for deployment is featured with light weight, high efficiency, and stability. As a result, the models generated under the training framework can hardly work directly under the framework used for deployment, and at this point, model conversion needs to be carried out.

During model conversion, a model itself is often accompanied by operations such as quantization and pruning due to the requirements for the performance of the model, and the correctness of the converted model is questionable due to a series of impacts on data type support, operator support or the like caused by framework change. The correctness of the deployment model is crucial to whether the deployment model can be used, and the correctness of a converted product needs to be verified. Therefore, that is a wide demand for a method for correctness verification after model conversion.

When the correctness of the model is verified using a current conventional method, the cost of a successfully converted network is low, but the problem location efficiency is low when the deployment model is inconsistent with an expected result.

To this end, there is a need for a technical solution capable of efficiently and quickly locate a problem while detecting and analyzing the results of nodes of the deployment model.

SUMMARY

The application is intended to provide a method for verifying correctness of model conversion under a deployment framework and a computing device, by which the results of nodes of the deployment model can be detected and analyzed automatically and a problem can be located efficiently and quickly.

According to an aspect of the application, a method for verifying correctness of model conversion under a deployment framework is provided. The method includes:

- acquiring, under a training framework, a trained model to be converted;
- acquiring a first intermediate result of the trained model to be converted, as contrast data;
- converting the trained model to be converted, into a deployment model;
- loading the deployment model under the deployment framework;
- executing the deployment model and acquiring a second intermediate result; and
- comparing the second intermediate results of the deployment model with the contrast data of the trained model, to locate a correctness-related problem of the deployment model before execution of the deployment model is completed.

According to some embodiments, acquiring the first intermediate results of the trained model includes acquiring result data of preset nodes; and after the trained model is converted into the deployment model, the method further includes:

- setting an output name correspondence rule list for various types of nodes after conversion;
- loading the deployment model to construct a deployment model execution graph; and
- generating a contrast graph of the deployment model execution graph according to the output name correspondence rule list;
- wherein executing the deployment model and acquiring the second intermediate result include: executing the deployment model execution graph node by node and acquiring execution results of the nodes; and
- comparing the second intermediate results of the deployment model with the contrast data of the trained model includes: comparing the execution results of the nodes with the contrast data according to the contrast graph.

According to some embodiments, setting an output name correspondence rule list for various types of nodes after conversion includes:

- generating, for directly corresponding nodes, the output name correspondence rule list according to an output name modification rule during the model conversion; and/or
- generating, for split and/or combined nodes, the output name correspondence rule list according to name conversion rules of the nodes.

According to some embodiments, constructing a deployment model execution graph includes:

- resolving topological information of the deployment model; and
- applying the topological information to construct the deployment model execution graph, comprising a plurality of nodes.

According to some embodiments, generating a contrast graph of the deployment model execution graph according to the name correspondence rule list includes:

- mapping an output name of each of the nodes in the deployment model back to a preset node in the trained model according to the output name correspondence rule list;

confirming attributes of corresponding nodes in the deployment model execution graph according to whether the mapping is successful or not; and generating the contrast graph of the deployment model execution graph depending on the attributes of the nodes.

According to some embodiments, confirming attributes of corresponding nodes in the deployment model execution graph includes:

if the mapping is successful, setting the corresponding nodes as a first type of nodes in need of execution result comparison; and if the mapping is failed, setting the corresponding nodes as a second type of nodes in no need of execution result comparison.

According to some embodiments, executing the deployment model execution graph node by node and comparing the execution results of the nodes with the contrast data according to the contrast graph include:

executing the deployment model execution graph node by node and acquiring execution results;

confirming whether to perform result comparison according to the attributes of a same node in the contrast graph;

if confirming to perform the result comparison, adaptively loading contrast data of the corresponding node in the trained model; and comparing the execution results with the contrast data.

According to some embodiments, confirming whether to perform result comparison according to the attributes of a same node in the contrast graph includes:

acquiring the attributes of the same node in the contrast graph;

if the attributes indicate the first type of nodes, proceeding with a subsequent step; and if the attributes indicate the second type of nodes, directly skipping to execute a next node.

According to some embodiments, analyzing the result includes:

performing analytic error statistics on the comparison result to generate an error graph;

when executing at a node with a node error reaching or exceeding an error threshold, interrupting the executing; and outputting a currently generated error graph and a file recording error information.

According to some embodiments, analyzing the result further includes:

the error graph is a topological graph consisting of output names and error rates of the nodes.

According to another aspect of the application, a computing device is provided. The computing device includes:

a processor; and a memory storing a computer program, wherein the computer program when executed by the processor causes the processor to execute the method according to any description above.

According to another aspect of the application, a non-transient computer-readable storage medium is provided, in which a computer-readable instruction is stored, wherein the instruction when executed by a processor, causes the processor to execute the method according to any description above.

According to an exemplary embodiment, based on the execution graph and the contrast graph, the execution results of the nodes are compared with the contrast data during execution, such that a node with a large deviation may be located in the model without executing the complete model, which can efficiently and quickly locate a correctness-related problem, improve the deployment efficiency of the model, and save the computing power and resources.

According to some embodiments, the correctness inspection accuracy and the output error range of the model can be controlled by setting error thresholds. Correctness verification is performed within the determined error range, and is interrupted in the case that the node error exceeds the error thresholds; the error information and the error graph can be prompted preferentially; and the source and change law of the error can be displayed visually.

It should be understood that the general description above and the detailed description below are merely exemplary, and are not intended to limit the application.

BRIEF DESCRIPTION OF THE DRAWINGS

To describe the technical solutions in the embodiments of the application more clearly, the following briefly introduces the accompanying drawings required for describing the embodiments.

DETAILED DESCRIPTION OF EMBODIMENTS

Figure 1A:
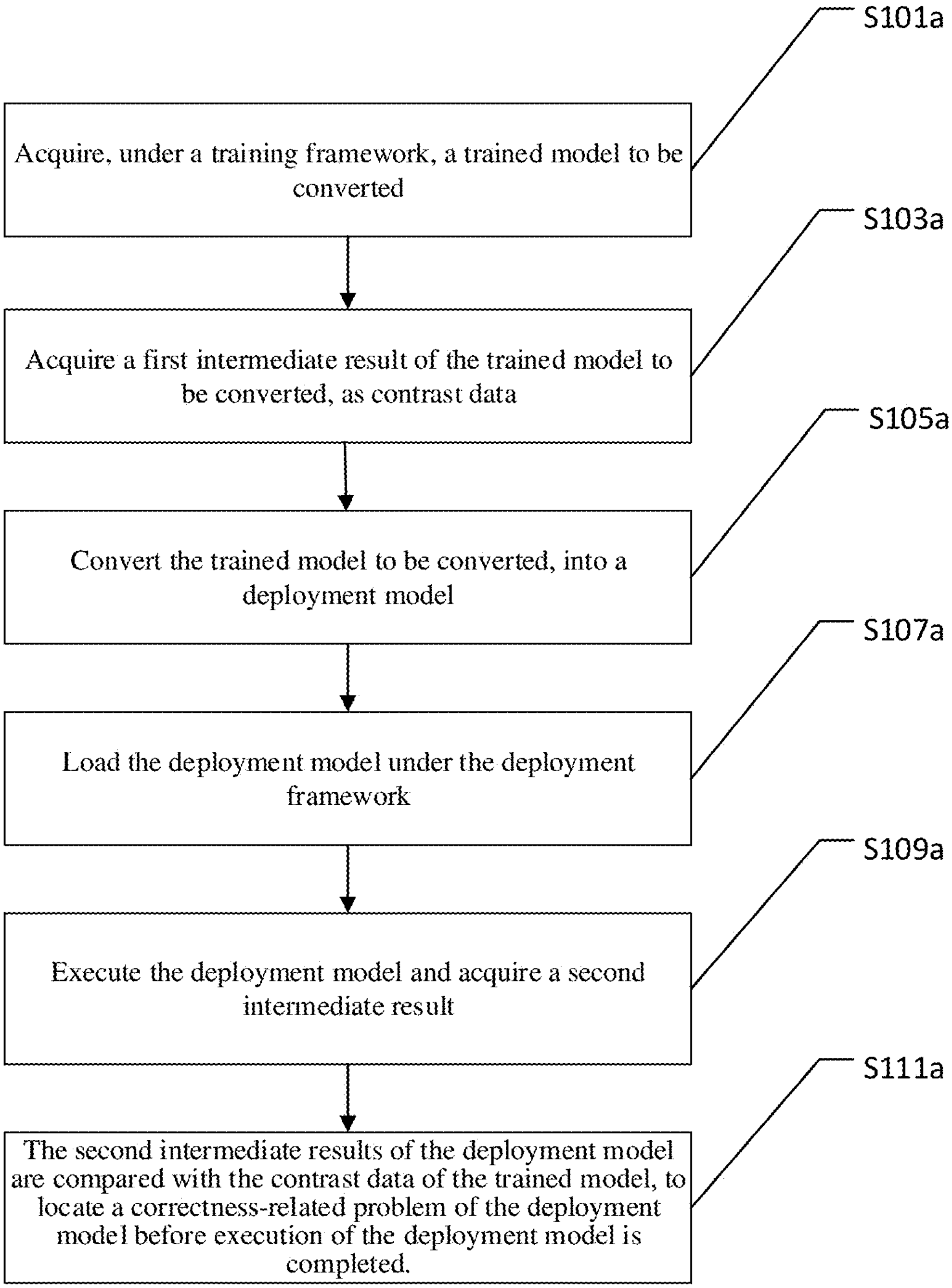
FIG. 1A shows a flowchart of a method for verifying correctness of model conversion under a deployment framework according to an exemplary embodiment.

Exemplary embodiments will now be described more fully with reference to the accompanying drawings. However, these exemplary embodiments can be implemented in a variety of forms and should not be understood as being limited to the embodiments described herein. On the contrary, these embodiments are provided such that the application will become comprehensive and complete, and the conception of the exemplary embodiments is fully communicated to those skilled in the art. Identical reference signs in the drawings represent identical or similar parts, and their repeated description will be omitted accordingly.

Furthermore, the described features, structures, or properties can be combined in one or more embodiments in any appropriate manner. In the description below, many specific details are provided to thus provide full understanding of the embodiments of the application. However, those skilled in the art should be aware that the technical solutions of the application can be practiced without one or more of the specific details, or other methods, constituent elements, devices, steps, or the like can be used. In other cases, the known methods, devices, implementations, or operations are not shown or described in detail to avoid obscuring the aspects of the application.

The block diagram shown in the accompanying drawings is only a functional entity, and does not necessarily have to correspond to physically independent entities. That is, these functional entities may be implemented in a software form, or in one or more hardware modules or integrated circuits, or in different networks and/or processor devices and/or microcontroller devices.

The flowchart shown in the accompanying drawings is only for an illustrative purpose, and does not have to include all the content and operations/steps, nor does it have to be executed in the described sequence. For example, some operations/steps may be broken down, while other operations/steps may be combined or partially combined. Therefore, the order in which the actual execution occurs may vary depending on the actual condition.

It should be understood that, although the terms such as first, second, and third may be used herein to describe various components, these components should not be limited by these terms. These terms are intended to distinguish one component from another component. Therefore, a first component discussed below may be referred to as a second component without deviating from the teaching of the concept of the application. As used herein, the term "and/or" includes any one of or a combination of one or more of the associated items as listed.

The user information (including but not limited to user equipment information, user's personal information or the like) and data (including but not limited to data for analysis, stored data, exhibited data or the like) involved in the application are all authorized by users or fully authorized by all parties; the acquisition, use and processing of relevant data shall comply with the relevant laws, regulations and standards in relevant countries and regions; and corresponding operation entries should be provided for users to choose for authorization or rejection.

Those skilled in the art may understand that the accompanying drawings are only schematic diagrams of exemplary embodiments, and the modules or flow processes in the accompanying drawings are not necessarily required for implementing the application, and thus cannot be used to limit the protection scope of the application.

In the field of deep learning, the training and deployment of a deep learning model is typically conducted in different deep learning frameworks.

During model conversion, a model itself is often accompanied by operations such as quantization and pruning due to the requirements for the performance of the model, and the correctness of the converted model is questionable due to a series of impacts on data type support, operator support or the like caused by framework change. The correctness of the deployment model is crucial to whether the deployment model can be used, and the correctness of a converted product needs to be verified.

When the correctness of the model is verified using a current conventional method, the cost of a successfully converted network is low, but the problem location efficiency is low when the deployment model is inconsistent with an expected result.

To this end, the application provides a method for verifying correctness of model conversion under a deployment framework and a computing device, by which a name correspondence rule list, and a contrast graph under the deployment framework, are constructed to allow for automated detection and analysis of nodes of the deployment model one-by-one, output of an error graph and error data, and efficient and quick location of a correctness-related problem.

The exemplary embodiments of the application are illustrated below in combination with the accompanying drawings.

FIG. 1A shows a flowchart of a method for verifying correctness of model conversion under a deployment framework according to an exemplary embodiment.

Referring FIG. 1A, the application provides a method for verifying correctness of model conversion under a deployment framework. The method includes steps as follows.

In S101*a*, a trained model to be converted is acquired under a training framework.

According to some embodiments, under the training framework, a trained model to be converted is run, and after the model is confirmed to run stably under the training framework, the trained model to be converted is acquired.

In S103*a*, a first intermediate result of the trained model to be converted are acquired as contrast data.

According to some embodiments, the model is trained by a deep learning framework to obtain a well-trained model. The model is run under the training framework. The output data of the nodes of the model are saved as contrast data for subsequent correctness test of the converted model. A plurality of sets of the contrast data may be saved for the same model so as to fully verify the correctness of the converted model.

In S105*a*, the trained model to be converted is converted into a deployment model.

According to some embodiments, a model conversion tool or library, such as a tf.lite tool of TensorFlow, a torch.onnx tool of PyTorch or the like, is generally required for converting the well-trained model into the deployment model.

In S107*a*, the deployment model is located under a deployment framework.

According to some embodiments, the converted deployment model is loaded and run under the deployment framework. Before formal loading, it is necessary to make inspection to ensure that the deployment framework has been correctly installed and configured, and to convert the deployment model into a format such as a SavedModel format of TensorFlow, an ONNX format of PyTorch or others supportable by the deployment framework. API or a command line tool, such as gRPC API of TensorFlow Serving, C++ API of ONNX Runtime or the like, provided by the deployment framework may be used to load the deployment model.

In S109*a*, the deployment model is executed and a second intermediate result are acquired.

According to some embodiments, the deployment model is executed under the deployment framework. The output results of the deployment model are acquired.

In S111*a*, the second intermediate results of the deployment model are compared with the contrast data of the trained model, to locate a correctness-related problem of the deployment model before execution of the deployment model is completed.

According to some embodiments, the second intermediate results of the deployment model are compared with the contrast data of the trained model; the output data of main nodes or all of the nodes to be compared are compared; the deployment model is run node by node; and the intermediate results of the deployment model are compared with the contrast data of the trained model, to locate a correctness-related problem of the deployment model before execution of the deployment model is completed.

Figure 1B:
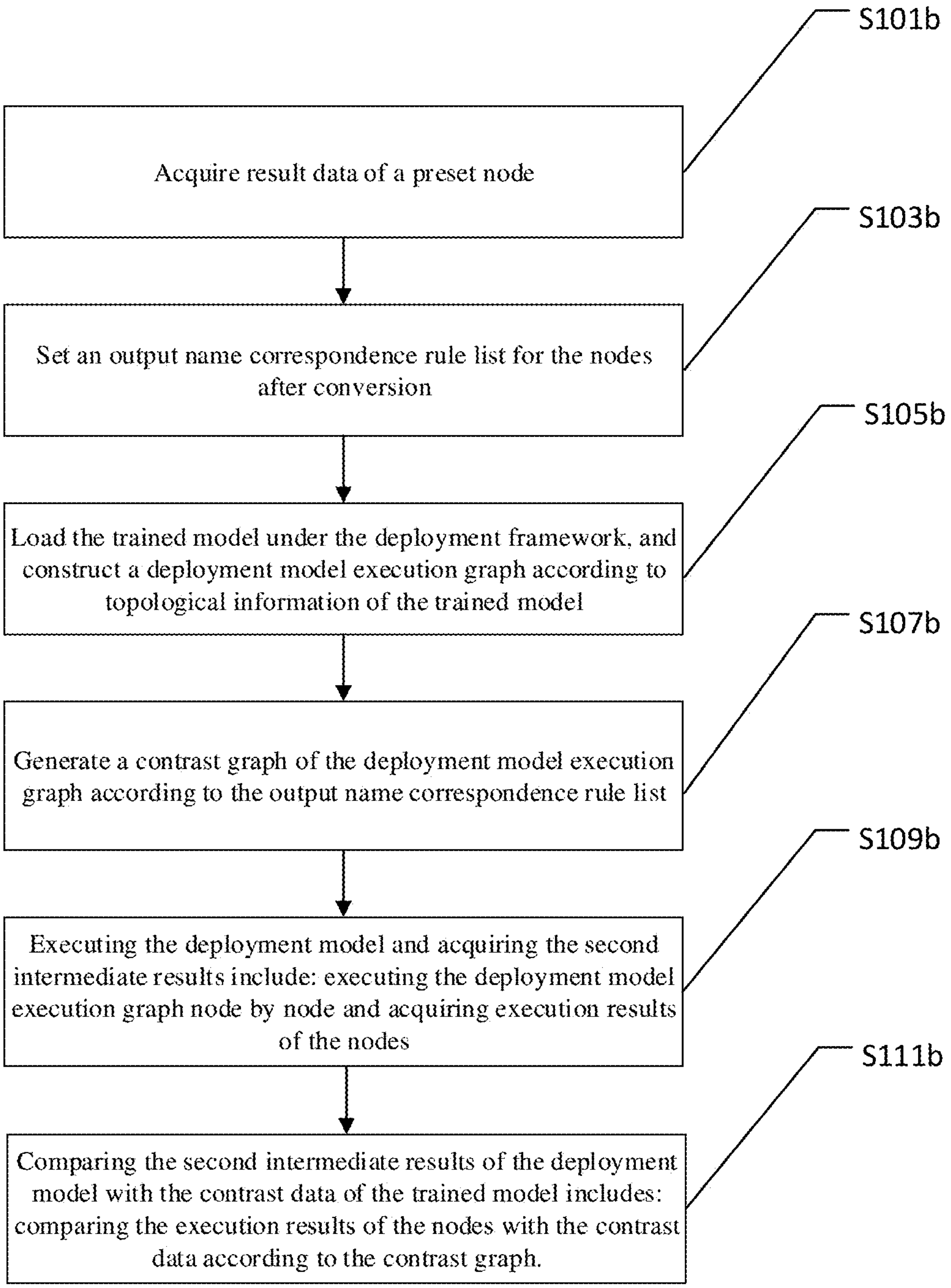
FIG. 1B shows a flowchart of another method for verifying correctness of model conversion under a deployment framework according to an exemplary embodiment.

FIG. 1B shows a flowchart of another method for verifying correctness of model conversion under a deployment framework according to an exemplary embodiment.

Referring to FIG. 1B, in S101*b*, the result data of a preset node are acquired.

According to some embodiments, the model is run under the training framework. The first intermediate results output by the nodes of the model are saved as contrast data for subsequent correctness test of the converted model. A plurality of sets of the contrast data may be saved for the same model so as to fully verify the correctness of the converted model.

According to some embodiments, the preset node is a key output node according to the contrast graph or model. In the scenario of different verification scenes and test modes, a key node is selected or applied as the preset node to cooperate with some or all of the intermediate nodes, the result data output by the preset node is reserved as contrast data for verifying the converted model.

In S103*b*, an output name correspondence rule list for various types of nodes after conversion is set.

According to some embodiments, the converted model is run under the deployment framework to obtain the output data names of nodes of various types, which are compared with the output names of corresponding nodes under the training framework. During conversion of the output names of the nodes of the same node type, the name generation and modification rules are stable, and based on name comparison, the name change rules of different nodes are statistically stored to generate a contrast rule list of names. For example, if a node A has an output name of "3638" in the trained model, and has an output name of "from_3638" after model conversion under the deployment framework, the statistical rule for the nodes of the type of the node A may be that "from_" is removed to achieve the output name in contrast. A similar rule is accordingly used for other nodes to obtain, by means of statistics, the output name correspondence rule list after model conversion.

In S105*b*, the deployment model is loaded to construct a deployment model execution graph.

According to some embodiments, the converted model is loaded under the deployment framework, and topological information is resolved according to a description file after the model conversion, to generate a deployment model execution graph, with the node corresponding to an index and the output name in the description file.

In S107*b*, a contrast graph of the deployment model execution graph is generated according to the output name correspondence rule list.

According to some embodiments, according to the output name correspondence rule list, the corresponding output names of the nodes in the model under the training framework are found in the output name correspondence rule list, with respect to the nodes in the deployment model execution graph.

According to some embodiments, when the converted model is run in the deployment framework, some types of nodes are split into a plurality of sub-nodes, corresponding to a plurality of output names respectively, during the process of model conversion. For example, the output name of a node E is "4565", and after model conversion, the node is split into three sub-nodes, with the output names of "4565_split_0", "4565_split_1", and "4565_split_2", respectively. Then, the statistical rule for the nodes of the type of the node E may be that "_split_2" is removed to achieve the output name in contrast.

According to some embodiments, a node sometimes has more than one output name, and during conversion of this type of node, the node may also be split into a plurality of sub-nodes, among which each sub-node may have a plurality of output names. For example, the output name of a node E is "4565" consisting of two outputs, and after model conversion, the node is split into three sub-nodes, with the output names of "4565_split_0", "4565:0", and "4565:1", respectively. Then, the statistical rule for the type of the node E may be that ":0" and ":1" are added to achieve the output name in contrast.

According to some embodiments, depending on the splitting condition of the node, a subsequent determination is associated by means of a defined naming rule. When a plurality of outputs of a node in the trained model are split into the outputs of different nodes in the deployment model, a naming rule needs to be established to ensure that the sub-nodes corresponding to these outputs are reserved as contrast nodes; and when a plurality of outputs are located on the same sub-node, the sub-node is reserved as the contrast node. This type of sub-nodes in the model under the deployment framework cannot achieve the one-to-one correspondence mapping relationship in the trained model due to naming reasons; a single or a plurality of sub-nodes corresponding to a node/nodes under the training framework may be taken as a contrast point/contrast points for comparison, in contrast to the output data; and the contrast is not made for the remaining sub-nodes.

According to some embodiments, when the converted model is run in the deployment framework, some types of nodes are combined into a node during the process of model conversion. For such nodes in the model under the deployment framework, exactly corresponding nodes cannot be found in the trained model either. By analyzing the topological information, the output data of the last node in a structural flow process, where the plurality of nodes combined under the training framework is located, may be used as a contrast point for comparison, in contrast to the output data.

According to some embodiments, whether contrast is need for nodes is identified according to the output name correspondence rule list and the topological information related to the deployment model execution graph. For example, referring to FIG. 4, points in no need of contrast are marked with first marks (see solid nodes), and points in need of contrast are marked with second marks (see hollow nodes), such that a contrast graph of the deployment model execution is constructed.

In S109*b*, executing the deployment model and acquiring the second intermediate results include: executing the deployment model execution graph node by node and acquiring execution results of the nodes.

According to some embodiments, the deployment model is run under the deployment framework, the deployment model execution graph is executed node by node, and after the execution on each node, the output data of each node is acquired as an execution result.

In S111*b*, comparing the second intermediate results of the deployment model with the contrast data of the trained model includes: comparing the execution results of the nodes with the contrast data according to the contrast graph.

According to some embodiments, in case of the deployment model, the converted model is run node by node to acquire data results after execution. Whether to perform result comparison is confirmed according to the attributes of the same node in the contrast graph. For example, in case of a solid-marked node, contrast data comparison is not needed, and the process proceeds to a next node. In case of a hollow-marked node, data comparison is needed. For a node in need of comparison, the contrast data of a corresponding node are loaded according to the attributes of the contrast data, and the result data are compared with the contrast data.

According to some embodiments, the result data are compared with the contrast data, and error analysis and statistics are performed on comparison results. Error statistics is performed on the result of each node to generate an error graph. The error graph is a topological graph containing output names and error rates of the nodes. Here, the error rate of each node may be expressed using a fill label and a proportion.

According to some embodiments, when the process of running the converted model node by node proceeds to a node, if the error value in the comparison result of the node reaches a specified error threshold, an error graph is directly generated with execution of a next node, a file recording detailed error information is output, a problem node is located in time, and the cause of problem is fed back.

According to some embodiments, in the error graph, the filling label may be used to represent the error rate of each node. For example, the blank inside a node is filled, and the proportion of a filled area may be used to express the error rate. For a node in no need of contrast, additional filling may be used as an identifier and indicated in annotations.

Figure 2:
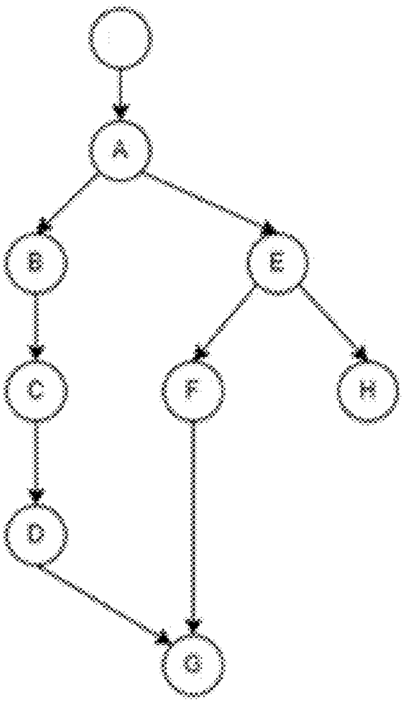
FIG. 2 shows a schematic diagram of model fragments under a training framework for a method for verifying correctness of model conversion under a deployment framework according to an exemplary embodiment.

FIG. 2 shows a schematic diagram of model fragments under a training framework for a method for verifying correctness of model conversion under a deployment framework according to an exemplary embodiment.

Referring to FIG. 2, the topological information of the model is analyzed under the training framework to generate a schematic diagram of the model, and the output names of nodes A, B, C, D, E, F, G, and H may be labeled. The model is run, and the output names and the output data of the corresponding modes are saved.

According to some embodiments, the output names are used for reference in the subsequent output name correspondence rule list. The output names resulting from running the model under the deployment framework are compared with reference to the output names under the training framework, to obtain the output name correspondence rule list.

According to some embodiments, in case of the trained model, the model is run to obtain the output data of nodes, and the output data are used as contrast data in correctness verification after the model conversion.

According to some embodiments, for directly corresponding nodes, the output name correspondence rule list is generated according to an output name modification rule during the model conversion. According to some embodiments, for split and/or combined nodes, the output name correspondence rule list is generated according to name conversion rules of different types of nodes.

For example, the nodes of different types have their own name modification rules, and when the name correspondence rule list, a rule for splitting and/or combining nodes and a rule for the directly corresponding nodes are recorded correspondingly. When the output names of the nodes under the deployment framework are mapped back to the output names of the nodes under the training framework, whether the output indicates split or combined nodes is first checked by means of the correspondence rule list for inverse mapping of the names, and then, the output name correspondence rule list is applied to inversely map the output names of the nodes in terms of the type of nodes.

According to some embodiments, the converted model is run to obtain the output data names of the nodes. During conversion of output names of nodes of the same node type, the name generation and modification rules are stable, and based on name comparison, the name change rules of different nodes are statistically stored to generate a contrast rule list of names. For example, if a node A has an output name of “3638” in the trained model, and has an output name of “from_3638” after model conversion under the deployment framework, the statistical rule for the nodes of the type of the node A may be that “from” is removed to achieve the output name.

According to some embodiments, some types of nodes are split into a plurality of sub-nodes, corresponding to a plurality of output names respectively, during the process of model conversion. For example, the output name of a node E is “4565”, and after model conversion, the node is split into three sub-nodes, with the output names of “4565_split_0”, “4565_split_1”, and “4565_split_2”, respectively. Then, the statistical rule for the nodes of the type of the node E may be that “_split_2” is removed to achieve the output name.

According to some embodiments, a node sometimes has more than one output name, and during conversion of this type of node, the node may also be split into a plurality of sub-nodes, among which each sub-node may have a plurality of output names. For example, the output name of a node E is “4565” consisting of two outputs, and after model conversion, the node is split into three sub-nodes, with the output names of “4565_split_0”, “4565:0”, and “4565:1”, respectively. Then, the statistical rule for the type of the node E may be that “:0” and “:1” are added to achieve the output name in contrast.

According to some embodiments, some types of nodes are combined into a node during the process of model conversion. For such nodes in the model under the deployment framework, exactly corresponding nodes cannot be found in the trained model either. By analyzing the topological information, the output data of the last node in a structural flow process, where the plurality of nodes combined under the training framework is located, may be used as a contrast point for comparison, in contrast to the output data.

According to some embodiments, the nodes are processed depending on their types according to the corresponding rules similar to the above rules, and the output name correspondence rule list after model conversion is obtained by statistics.

Figure 3:
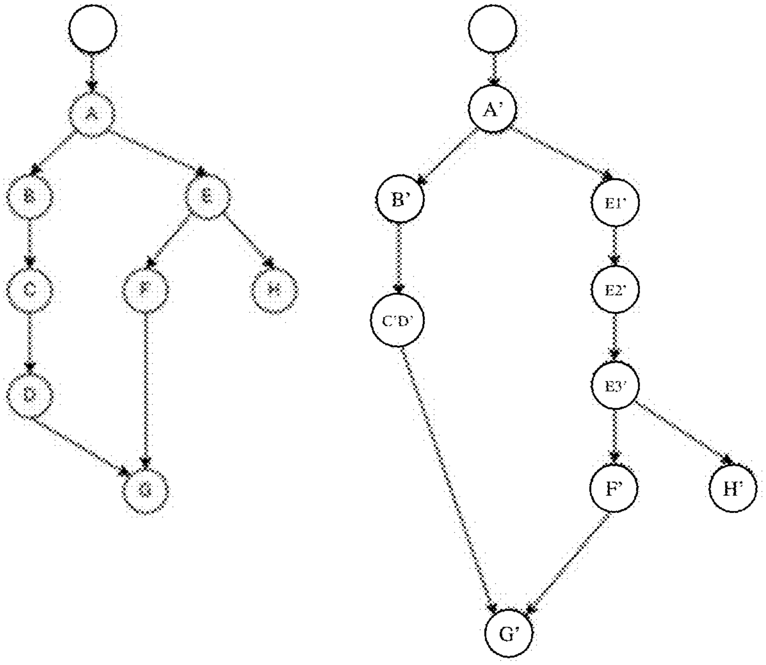
FIG. 3 shows a deployment execution graph for a method for verifying correctness of model conversion under a deployment framework according to an exemplary embodiment.

FIG. 3 shows a deployment execution graph for a method for verifying correctness of model conversion under a deployment framework according to an exemplary embodiment.

Referring to FIG. 3, topological information of the deployment model is resolved. The topological information is applied to construct the deployment model execution graph, the deployment model execution graph including a plurality of nodes A', B', C'D', E1', E2', E3', F', G', and H'.

According to some embodiments, resolving the topological information of the deployment model involves the number of individual components forming the model and their connection relationships between each other, and these connection relationships are applied to construct the deployment model execution graph.

Figure 4:
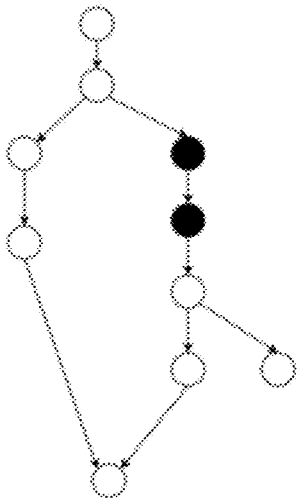
FIG. 4 shows a contrast graph of a deployment model execution graph for a method for verifying correctness of model conversion under a deployment framework according to an exemplary embodiment.

FIG. 4 shows a contrast graph of a deployment model execution graph for a method for verifying correctness of model conversion under a deployment framework according to an exemplary embodiment.

Referring to FIG. 4, an output name of each of the nodes in the deployment model is mapped back to a preset node in the trained model according to the output name correspondence rule list. The attributes of corresponding nodes in the deployment model execution graph are confirmed according to whether the mapping is successful or not. The contrast graph of the deployment model execution graph is generated depending on the attributes of the nodes.

According to some embodiments, for the output names of the nodes in the model under the deployment model, the output names of the corresponding nodes in the corresponding model under the training framework are searched in the output name correspondence rule list, and the output names in the deployment model are mapped back to the output names of the corresponding preset nodes in the model under the training framework. The attributes of the corresponding nodes in the contrast graph are confirmed according to whether the output names of the corresponding preset nodes exist or not.

According to some embodiments, during the process of model conversion, since the nodes have a plurality of types, not all of the corresponding names can be accordingly found in the output name correspondence rule list during the process of mapping the output names of the corresponding nodes under the deployment framework back to the trained model, and thus, the attributes are added to the contrast graph for distinguishing whether the nodes have corresponding nodes under the training framework. The contrast graph of the deployment model execution graph is generated depending on the attributes of the nodes.

According to some embodiments, the attributes of the nodes in the deployment model execution graph are confirmed one-by-one, and the deployment model contrast graph is generated depending on the attribute identifiers of the nodes, for the subsequent correctness verification for model conversion.

Referring to FIG. 4, the attributes of corresponding nodes in the deployment model execution graph are confirmed according to whether the mapping is successful or not. If the mapping is successful, the corresponding nodes are set as a first type of nodes in need of execution result comparison; and if the mapping is failed, the corresponding nodes are set as a second type of nodes in no need of execution result comparison.

According to some embodiments, the attributes of the nodes in the deployment model contrast graph are based on whether the names corresponding to the output names of the nodes can be found in the output name correspondence rule list, i.e., mapping the output names of the nodes in the deployment model back to the trained model. If the mapping is successful, the corresponding nodes are set as a first type of nodes in need of execution result comparison; and if the mapping is failed, the corresponding nodes are set as a second type of nodes in no need of execution result comparison.

According to some embodiments, when the output names of the corresponding nodes exist, it may be agreed in the contrast graph that a specific mark is used as the identifier for the first type of nodes; and when the output names of the corresponding nodes do not exist, it is agreed in the contrast graph that another mark is used as the identifier for the second type of nodes. Referring to FIG. 4, the hollow circle is used as a first identifier in FIG. 4, indicating that the output name of a current node exists. The solid circle is used as a second identifier, indicating that, for the node, the output name of a corresponding node does not exist in the training model.

According to some embodiments, in the subsequent process of correctness verification, a contrast need to be made with the nodes in the deployment model contrast graph one-by-one; and before the contrast is executed, a determination is made according to the attributes of the nodes in the contrast graph as follows: when the attributes of the nodes are directed to a first type of nodes, correctness verification needs to be performed on these nodes, and when the nodes are directed to a second type of nodes, correctness verification is not needed to be performed on these nodes.

Figure 5:
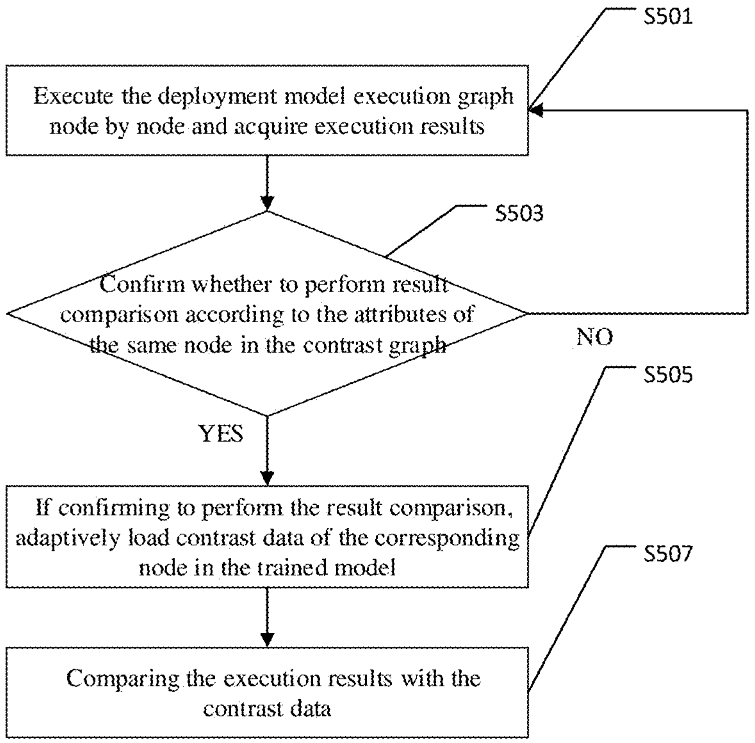
FIG. 5 shows flowchart of verification for a method for verifying correctness of model conversion under a deployment framework according to an exemplary embodiment.

FIG. 5 shows flowchart of verification for a method for verifying correctness of model conversion under a deployment framework according to an exemplary embodiment.

In S501, the deployment model execution graph is executed node by node and the execution results are acquired.

According to some embodiments, the nodes in the graph are extracted in an execution sequence in the deployment model execution graph, and an operation is performed on a current node in the deployment model execution graph; and the output data of the currently executed node are acquired.

In S503, whether to perform result comparison is confirmed according to the attributes of the same node in the contrast graph.

According to some embodiments, the attribute identifier of the same node in the contrast graph is acquired; whether to perform result comparison is determined; when the attribute identifier of the node is a first identifier, correctness verification needs to be performed on the node; and when the attribute identifier of the node is a second identifier, correctness verification does not need to be performed on the node.

According to some embodiments, the attributes of the same node in the contrast graph are acquired; if the attributes are directed to the first type of nodes, the subsequent step S505 is continuously executed; and if the attributes are directed to the second type of nodes, the process is skipped to S501 for a next node.

In S505, if it is confirmed to perform the result comparison, the contrast data of the corresponding node in the trained model are adaptively loaded.

In S507, the execution results are compared with the contrast data.

According to some embodiments, the contrast data are loaded according to the attributes of the contrast data, and the output data output by a current node are compared with the loaded output data in an output name of a corresponding node. It should be noted that, depending on the application framework of the model, the data type varies between the output data, and the data should be compared and analyzed after the data types of the contrast data and the output data are unified. In general, the contrast data may be converted to a double type one-by-one, and then subjected to numerical comparison and analysis.

Figure 6A:
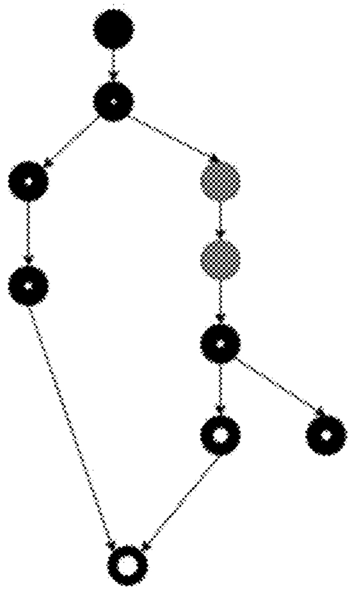
FIG. 6A shows an error graph for a method for verifying correctness of model conversion under a deployment framework according to an exemplary embodiment.
Figure 6B:
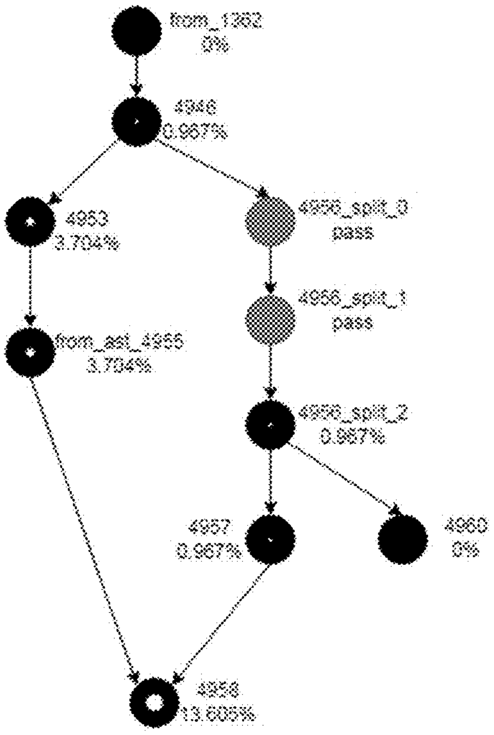
FIG. 6B shows a verification error graph for a method for verifying correctness of model conversion under a deployment framework according to an exemplary embodiment.

FIG. 6A and FIG. 6B show verification error graphs for a method for verifying correctness of model conversion under a deployment framework according to an exemplary embodiment. Analytic error statistics is performed on the comparison result to generate an error graph.

According to some embodiments, the contrast data are compared with the output data of the nodes in the deployment model execution graph, error statistics is performed on the comparison results, and an error rate is calculated.

According to some embodiments, an error graph is constructed according to the calculated error rate and the related topological information of the deployment model execution graph.

According to some embodiments, different fillings may be used in the error graph to represent the error rates of the nodes. For example, referring to FIG. 6A and FIG. 6B, the blank inside a node is filled, and the proportion of a filled area may be used to express the error rate. For a node in no need of contrast, additional filling may be used as an identifier (light fillings in FIG. 6A and FIG. 6B indicates nodes in no need of contrast) and indicated in annotations.

When execution proceeds to a node with a node error reaching or exceeding an error threshold, the execution is interrupted; and a currently generated error graph and a file recording error information are output.

According to some embodiments, when verification proceeds to a node, if a calculated node error reaches or exceeds a defined error threshold, the execution for subsequent nodes is interrupted, the error graph of the nodes of which the verification has been completed is output, and a file specifically recording the error information is output; the running problem of the model is fed back in time; and the problem point of the converted model is accurately located to facilitate subsequent accurate adjustment.

The error graph is a topological graph consisting of output names and error rates of the nodes.

According to some embodiments, the error graph is a topological graph consisting of the output names of and error rates of the nodes. The error graph includes the number of nodes and their connection relationships between each other, and these connection relationships are applied to construct the error graph.

According to some embodiments, the method of the application avoids the problems in the traditional verification that: a plurality of error information is accumulatively reported due to a problem node after overall verification, and a key problem point can hardly be determined from the report, making it difficult to locate the problem point; the adjustment is not performed in a targeted way; and as a result, a large amount of time is needed for repeated change and confirmation, as well as overall detection, which is time-consuming and labor-intensive. According to the method of the application, the accuracy of correctness verification and the output error range of the model can be controlled by defining the error thresholds; correctness verification is performed within the determined error range, and is interrupted in the case that the node error exceeds the error thresholds; the error information and the error graph can be prompted preferentially; and the source and change law of the error can be displayed visually.

According to some embodiments, the method of the application has an automated flow process without manual comparison layer by layer, and the contrast data can be adaptively loaded, eliminating the problem related to data comparison caused by inconsistent data types before and after model conversion.

Figure 7:
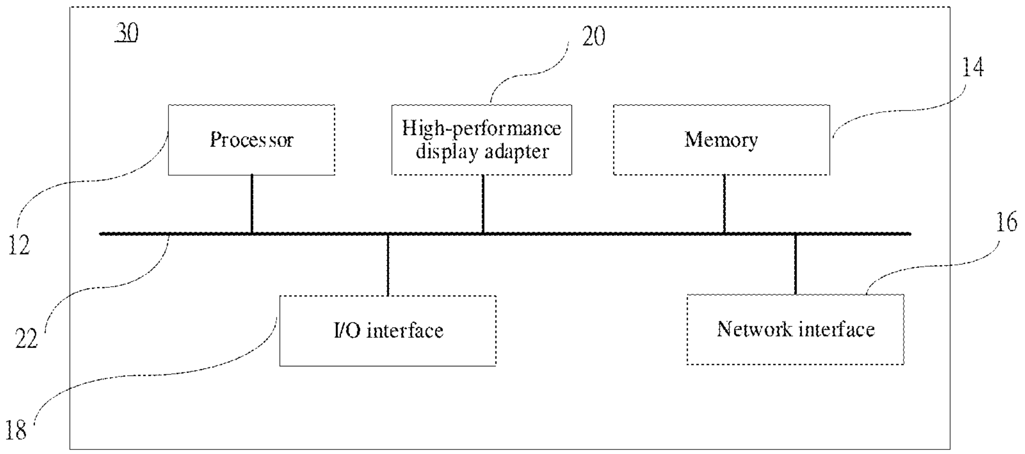
FIG. 7 shows a block diagram of a computing device according to an exemplary embodiment.

FIG. 7 shows a block diagram of a computing device according to an exemplary embodiment.

As shown in FIG. 7, the computing device 30 includes a processor 12 and a memory 14. The computing device 30 may further include a bus 22, a network interface 16, and an I/O interface 18. The processor 12, the memory 14, the network interface 16, and the I/O interface 18 may communicated with each other via the bus 22.

The processor 12 may include one or more general-purpose central processing units (CPUs), microprocessors, or dedicated integrated circuits or the like to execute related program instructions. According to some embodiments, the computing device 30 may further include a high-performance display adapter (GPU) 20 for accelerating the processor 12.

The memory 14 may include a computer system-readable medium in the form of a volatile memory, for example, a random-access memory (RAM), a read-only memory (ROM), and/or a cache memory. The memory 14 is configured to store one or more programs and data containing instructions. The processor 12 may read instructions stored in the memory 14 to execute the method described above according to the embodiments of the application.

The computing device 30 may also communicate with one or more networks via the network interface 16. The network interface 16 may be a wireless network interface.

The bus 22 may include an address bus, a data bus, a control bus or the like. The bus 22 provides a path for exchanging information between various components.

It should be noted that, in a specific implementation process, the computing device 30 may further include other components necessary for the normal operation. In addition, a person skilled in the art may understand that the device described above may also include only the components necessary to implement the solutions of the embodiments in the present specification, and may not necessarily include all the components shown in the figures.

The application further provides a computer-readable storage medium storing a computer program. The program, when executed by a processor, implements the steps of the method described above. The computer-readable storage medium may include, but is not limited to, any types of disks, including floppy disks, optical disks, DVDs, CD-ROMs, micro-drivers and magnetooptical disks, ROMs, RAMs, EPROMS, EEPROMs, DRAMs, VRAMs, flash memory devices, magnetic or optical cards, nano-systems (including molecular memory ICs), network storage devices, cloud storage devices, or any type of media or devices adapted to storage of instructions and/or data.

An embodiment of the application further provides a computer program product, which includes a non-transient computer-readable storage medium storing a computer program. The computer program is operable to allow a computer to execute some or all steps of any method described in the method embodiments described above.

Those skilled in the art may clearly understand that the technical solutions of the application can be implemented by virtue of software and/or hardware. In the present Specification, "unit" and "module" refer to software and/or hardware capable of fulfilling specific functions independently or in cooperation with other components, and the hardware here may be, for example, a field programmable gate array, an integrated circuit, or the like.

It should be noted that, for the sake of simplicity in description, the foregoing method embodiments are described as a combination of a sequence of acts. However, those skilled in the art shall be informed that the application is not limited by the described order of acts, as some steps could occur in other orders or concurrently in accordance with the application. Further, a person skilled in the art shall also be informed that the embodiments as described in the Description are preferred embodiments, in which the acts and modules involved are not necessarily required by the application.

In the embodiments described above, the descriptions of the embodiments are emphasized differently, and for parts that are not described in detail in an embodiment, a reference may be made to the related descriptions in other embodiments.

In the several embodiments provided by the application, it should be understood that the disclosed apparatus may be implemented in other manners. For example, the apparatus embodiments described above are merely schematic. For example, the division of a unit only indicates logically functional division. There may be other divisions in actual implementation. For example, a plurality of units or components may be combined with or integrated into another system, or some features may be ignored or not executed. In another aspect, the mutual coupling or direct coupling or communication connection as shown or discussed may be indirect coupling or communication connection via some service interfaces, apparatuses or units, and may be in electrical, mechanical or other forms.

A unit described as a discrete component may be or may be not physically separated, and a component displayed as a unit may be or may be not a physical unit, and may be located at a place, or distributed over a plurality of network units. Some or all of the units may be selected based on actual needs to achieve the purpose of the solution of the embodiments.

In addition, the functional units in respective embodiments in the application may be integrated in a processing unit, or each unit may exist alone physically, or two or more units may be integrated in one unit. The integrated modules described above may be implemented in the form of hardware, or in the form of software function units.

The integrated units, if implemented in the form of the software function units or sold or used as separate products, may be stored in a computer-readable memory. Based on such an understanding, the essential part of the technical solutions in the application or the contribution made by the technical solutions to the prior art or part or all of the technical solutions may take the form of a software product. The computer software product may be stored in a memory, and includes a plurality of instructions allowing a computer device (which may be a personal computer, a server, or a network device and the like) to execute all or some of the steps of the method described in each embodiment of the application.

In the embodiments described above, the descriptions of the embodiments are emphasized differently, and for parts that are not described in detail in an embodiment, a reference may be made to the related descriptions in other embodiments.

The above provides detailed presentation and description of the exemplary embodiments of the application. It should be understood that the application is not limited to the detailed structure, arrangement mode, or implementation method described here. On the contrary, the application is intended to encompass various modifications and equipment configurations included within the spirit and scope of the attached Claims.

What is claimed is:

1. A method for verifying correctness of model conversion under a deployment framework, comprising:
- acquiring, under a training framework, a trained model to be converted;
- acquiring a first intermediate result of the trained model to be converted, as contrast data, wherein acquiring the first intermediate result of the trained model comprises acquiring result data of preset nodes;
- converting the trained model to be converted, into a deployment model;
- after the trained model is converted into the deployment model, setting an output name correspondence rule list for various types of nodes after conversion;
- loading the deployment model under the deployment framework to construct a deployment model execution graph;
- generating a contrast graph of the deployment model execution graph according to the output name correspondence rule list, wherein generating the contrast graph comprises:
  - mapping an output name of each of the nodes in the deployment model back to a preset node in the trained model according to the output name correspondence rule list;
  - confirming attributes of corresponding nodes in the deployment model execution graph according to whether the mapping is successful or not; and
  - generating the contrast graph of the deployment model execution graph depending on the attributes of the nodes;
- executing the deployment model and acquiring a second intermediate result, wherein executing the deployment model and acquiring the second intermediate result comprise executing the deployment mode execution graph node by node and acquiring execution results of the nodes; and
- comparing the second intermediate result of the deployment model with the contrast data of the trained model, to locate a correctness-related problem of the deployment model before execution of the deployment model is completed, wherein comparing the second intermediate result of the deployment model with the contrast data of the trained model comprises comparing the execution results of the nodes with the contrast data according to the contrast graph.

2. The method according to claim 1, wherein setting an output name correspondence rule list for various types of nodes after conversion comprises:
- generating, for directly corresponding nodes, the output name correspondence rule list according to an output name modification rule during the model conversion;
- and/or generating, for split and/or combined nodes, the output name correspondence rule list according to name conversion rules of the nodes.

3. The method according to claim 1, wherein constructing a deployment model execution graph comprises:
- resolving topological information of the deployment model; and
- applying the topological information to construct the deployment model execution graph comprising a plurality of nodes.

4. The method according to claim 1, wherein confirming attributes of corresponding nodes in the deployment model execution graph comprises:
- when the mapping is successful, setting the corresponding nodes as a first type of nodes in need of execution result comparison; and when the mapping fails, setting the corresponding nodes as a second type of nodes in no need of execution result comparison.

5. The method according to claim 4, wherein comparing the execution results of the nodes with the contrast data according to the contrast graph comprises:

confirming whether to perform result comparison according to the attributes of a same node in the contrast graph;

when confirming to perform the result comparison, adaptively loading contrast data of the corresponding node in the trained model; and comparing the execution results with the contrast data.

6. The method according to claim 5, wherein confirming whether to perform the result comparison according to the attributes of a same node in the contrast graph comprises:

acquiring the attributes of the same node in the contrast graph;

when the attributes indicate the first type of nodes, proceeding with a subsequent step; and when the attributes indicate the second type of nodes, directly skipping to execute a next node.

7. The method according to claim 1, further comprising:

performing analytic error statistics on comparison results between the execution results of the nodes and the contrast data, to generate an error graph;

when executing at a node with a node error reaching or exceeding an error threshold, interrupting the executing; and outputting a currently generated error graph and a file recording error information.

8. The method according to claim 7, wherein the error graph is a topological graph that includes output names and error rates of the nodes in the deployment model execution graph.

9. A computing device, comprising:

a processor; and a memory storing a computer program, wherein the computer program when executed by the processor causes the processor to execute a method verifying correctness of model conversion under a deployment framework, wherein the method comprising:

acquiring, under a training framework, a trained model to be converted;

acquiring a first intermediate result of the trained model to be converted, as contrast data, wherein acquiring the first intermediate result of the trained model comprises acquiring result data of preset nodes;

converting the trained model to be converted, into a deployment model;

after the trained model is converted into the deployment model, setting an output name correspondence rule list for various types of nodes after conversion;

loading the deployment model under the deployment framework to construct a deployment model execution graph;

generating a contrast graph of the deployment model execution graph according to the output name correspondence rule list, wherein generating the contrast graph comprises:

mapping an output name of each of the nodes in the deployment model back to a preset node in the trained model according to the output name correspondence rule list;

confirming attributes of corresponding nodes in the deployment model execution graph according to whether the mapping is successful or not; and generating the contrast graph of the deployment model execution graph depending on the attributes of the nodes;

executing the deployment model and acquiring a second intermediate result, wherein executing the deployment model and acquiring the second intermediate result comprise executing the deployment mode execution graph node by node and acquiring execution results of the nodes; and comparing the second intermediate result of the deployment model with the contrast data of the trained model, to locate a correctness-related problem of the deployment model before execution of the deployment model is completed, wherein comparing the second intermediate result of the deployment model with the contrast data of the trained model comprises comparing the execution results of the nodes with the contrast data according to the contrast graph.

10. The computing device according to claim 9, wherein setting an output name correspondence rule list for various types of nodes after conversion comprises:

generating, for directly corresponding nodes, the output name correspondence rule list according to an output name modification rule during the model conversion;

and/or generating, for split and/or combined nodes, the output name correspondence rule list according to name conversion rules of the nodes.

11. The computing device according to claim 9, wherein constructing a deployment model execution graph comprises:

resolving topological information of the deployment model; and applying the topological information to construct the deployment model execution graph comprising a plurality of nodes.

12. The computing device according to claim 9, wherein confirming attributes of corresponding nodes in the deployment model execution graph comprises:

when the mapping is successful, setting the corresponding nodes as a first type of nodes in need of execution result comparison; and when the mapping fails, setting the corresponding nodes as a second type of nodes in no need of execution result comparison.

13. The computing device according to claim 12, wherein comparing the execution results of the nodes with the contrast data according to the contrast graph comprises:

confirming whether to perform result comparison according to the attributes of a same node in the contrast graph;

when confirming to perform the result comparison, adaptively loading contrast data of the corresponding node in the trained model; and comparing the execution results with the contrast data.

14. The computing device according to claim 13, wherein confirming whether to perform the result comparison according to the attributes of a same node in the contrast graph comprises:

acquiring the attributes of the same node in the contrast graph;

when the attributes indicate the first type of nodes, proceeding with a subsequent step; and when the attributes indicate the second type of nodes, directly skipping to execute a next node.

15. The computing device according to claim 9, the method further comprising:

performing analytic error statistics on comparison results between the execution results of the nodes and the contrast data, to generate an error graph;

when executing at a node with a node error reaching or exceeding an error threshold, interrupting the executing; and outputting a currently generated error graph and a file recording error information.

16. A non-transitory computer-readable medium storing a computer program, wherein the program, when executed by a processor, causes the processor to execute the method of claim 1.

* * * * *